July 27, 1971 P. C. CECIL ET AL 3,595,693

PROCESS FOR PRODUCING STABILIZED NIOBIUM-TIN SUPERCONDUCTOR

Filed Jan. 8, 1968

United States Patent Office 3,595,693

Patented July 27, 1971

3,595,693

PROCESS FOR PRODUCING STABILIZED NIOBIUM-TIN SUPERCONDUCTOR

Peter C. Cecil, Holliston, Daniel F. Fairbanks, Winchester, and Daniel A. Reisner, Brockton, Mass., assignors to Norton Company Filed Jan. 8, 1968, Ser. No. 696,468
Int. Cl. C23c *11/08, 17/12*
U.S. Cl. 117—227 6 Claims

ABSTRACT OF THE DISCLOSURE

Superconductor, such as wire or strip, is coated with a thin strike coat of copper or other normal conductor metal, less than 50 microinches thick, by displacement reaction and then overcoated with normal conductor metal to stabilize the superconductor to produce a product characterized by highly adherent coating bond and to ease the problems of producing stabilized coatings on superconductors, particularly high field hard superconductors, such as niobium-tin.

Figure 1:
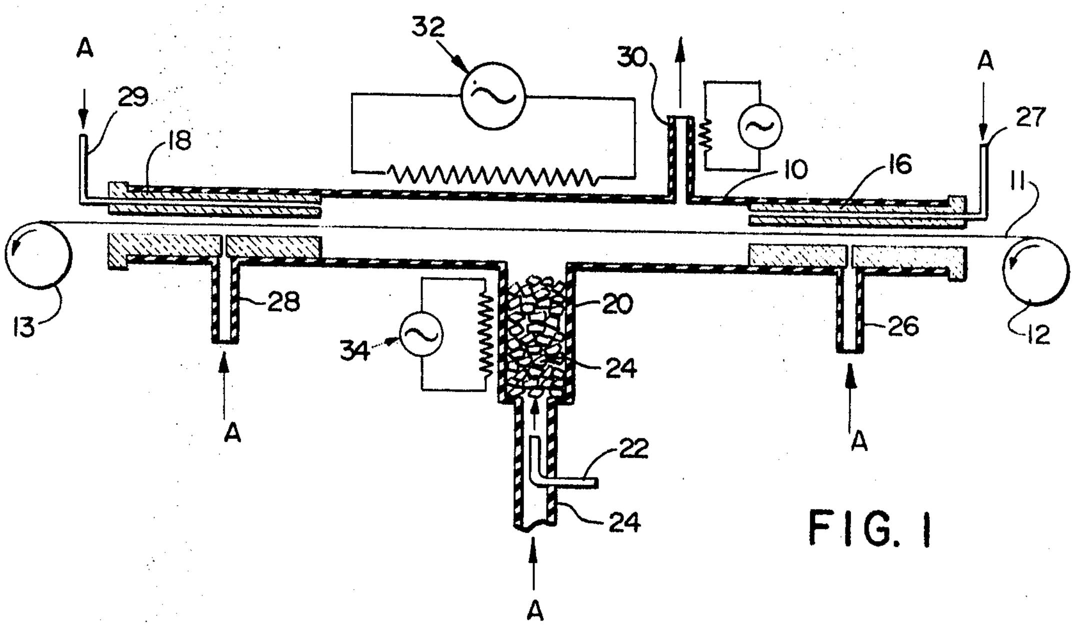

This invention relates to production of stabilized high field, hard superconducting materials.

BACKGROUND

There are several common high field, hard superconducting materials known to the art—cold drawn niobium, molybdenum-rhenium, niobium-zirconium alloys, niobium-titanium alloys, niobium-tin compound formed as a wire in situ, niobium-tin compound coating formed by diffusion, niobium-tin compound coating formed by co-deposition of niobium and tin derived from vacuum evaporation of the elements or chemical decomposition with an external reducing agent of niobium and tin salts, vanadium gallium in various forms and many other materials, per se or in reinforced matrix form. A particular concern of workers in this art is that such materials when used in electro-magnetic devices operating to high magnetic fields often demonstrate unstable operation and it is now well known that such instability can be counteracted, at least in part, by coating the superconductor with a normal conducting metal of high thermal and electrical conductivity.

The known superconductor-coating compositions include niobium-zirconium electroplated with copper, niobium-titanium clad with copper, niobium-tin coating overcoated with electroplated copper or silver using a nickel strike coat between the superconductive niobium-tin and copper or silver, and normal copper soldered to niobium-tin, the solder bond being facilitated in some instance by a strike coat of nickel.

There have been diverse difficulties in these combinations resulting in less than desired bond strength between superconductor and stabilizing metal, complexity of production operations and expense of the process (except for the niobium-titanium clad with copper). Some of the limiting factors contributing to these problems are vulnerability of some of the superconductive materials to high temperatures and/or cold working and inherent purity limitations of electroplating.

OBJECTS

It is the object of the present invention to provide an improved form of stabilized superconductor.

It is a further object of the invention to provide a superconductor coated with a highly adherent metal strike coat suitable for overcoating with the same metal or another metal.

It is a further object of the invention to provide a new method of coating a strike coat on a superconductor to produce the above strike coated superconductor product.

It is a further object of the invention to provide an improved method of stabilizing superconductors by adding the preliminary step of strike coating by displacement reaction.

It is a still further object of the invention to improve the stabilizing of superconductor of the type made of niobium-tin compound by hydrogen reduction, by providing an adherent coating of copper by displacement reaction between copper and the niobium-tin.

GENERAL DESCRIPTION

The product consists of a superconductor and strike coating with or without the further addition of a stabilizing coating and it may be in the form of a wire, ribbon, sheet, foil, plate, rod, cylinder or a variety of shapes and in a composition and/or state of fabrication so that the superconductor is a so-called "hard superconductor" or "superconductor of the third kind," all the foregoing selection factors being based on suitability of the superconductor for use under conditions requiring stabilization. The present invention is distinctly advantageous as applied to the crystalline niobium-tin coating formed by the hydrogen reduction process described in Canadian Pat. 706,348 to Hanak and Cooper of the Radio Corporation of America Research Laboratory. Such superconductor is described below as a preferred embodiment. It is also now clear that the invention offers unique advantages as specifically applied to this material and equivalent superconductors.

The strike coat is a normal metal selected principally for its ability readily to accept additional thick coating of metal having high thermal and electrical conductivity. It is also of advantage if the strike coating has high conductivity properties also. Other conventional selection factors are price, workability and strength at both room temperature and at the cryogenic temperatures conventionally employed for the operation of superconductors. Other selection factors primarily relevant in the context of this invention are electropositiveness of the normal conducting material relative to one or more components of the superconducting surface, availability in a volatile form of sufficiently high vapor pressure within reasonable temperature limits, and capability of chemically combining with surface contaminants of superconductors, such as oxygen, involatile form to remove what would otherwise be barriers to a good strike coating. The adhesion of the present strike coating is illustrated by the fact that it is not removed in the course of tinning for soldering on a heavy stabilizing overcoat. The strike coating formed by displacement reaction can also be readily characterized by its extreme thinness (which results in the strike coating conforming so closely to the surface roughness of the superconductor that from an exterior view, there is essentially no difference in roughness before and after coating) which is less than 50 microinches and generally substantially less, e.g. about 1–20 microinches and its complete coverage of the underlying superconductor consistent with such thin dimension. This is in contrast to coatings formed externally, as by vacuum evaporation or reduction with an external reducing agent which would form a complete coating only at thicknesses much greater than about 20 microinches. The strike coating is also characterized as forming an essentially metallurgical bond to the superconductor. The strike coating is also characterized by a crystalline structure of higher density compared to other tyes of vapor deposited coatings or platings.

The above subcombination can be further completed into the full combination of a stabilized superconductor by electroplating, soldering, dipping or vapor deposition by reduction or vacuum coating.

The process of producing the strike coat on the superconductor involves passing a source of the strike coat metal over the superconductor under temperature conditions to facilitate a speedy displacement reaction between the strike coat metal and one or more components of the superconductor surface, the said conditions being compatible with maintaining the critical current characteristics of the superconductor. In a preferred embodiment copper chloride contacts the above described crystalline niobium-tin superconductor at 700–725° C., although the temperature may be varied to as low as about 600 C. and as high as about 800 C. The superconductor need not be heated directly, but rather the entire reaction zone is heated to about the same temperature. External reducing agents are excluded from the reaction zone. Ambient air is excluded to a practical extent. The copper chloride at 700 C. is reduced by niobium and tin to form niobium chloride and tin chloride which volatilize. The chloride also combines with oxides at the superconductive surface to produce volatile niobium oxychlorides which have a high vapor pressure at 700 C. A substantial amount of oxygen escapes thus allowing the formation of the above noted metallurgical bond between superconductor and strike coating. The reaction is self-regulating in that it proceeds fastest at sites not previously covered by copper thus allowing the formation of a very quick, complete and dense coating of copper as noted above and inherently limiting the thickness of this strike coat to the very thin dimensions noted above.

Some examples of possible incompatibility between strike coat reaction conditions and superconductor would be in application of the above process to niobium-titanium superconductor whose critical current can be lowered by prolonged heating. In such instances, compatibility could be enhanced by running at shorter heating times, at lower temperatures and selecting normal metals or normal metal sources to facilitate use of lower temperatures, e.g. the use of copper organic compounds as more volatile sources of copper than copper chloride. Another approach to enhancing compatibility is to apply the strike coating and stabilizing overcoat at an intermediate stage of cold work processing of the superconductor and then continue to cold work to partially restore critical current effectiveness lost through the high temperature heating associated with application of the strike coating.

SPECIFIC DESCRIPTION AND DRAWINGS

Figure 2:
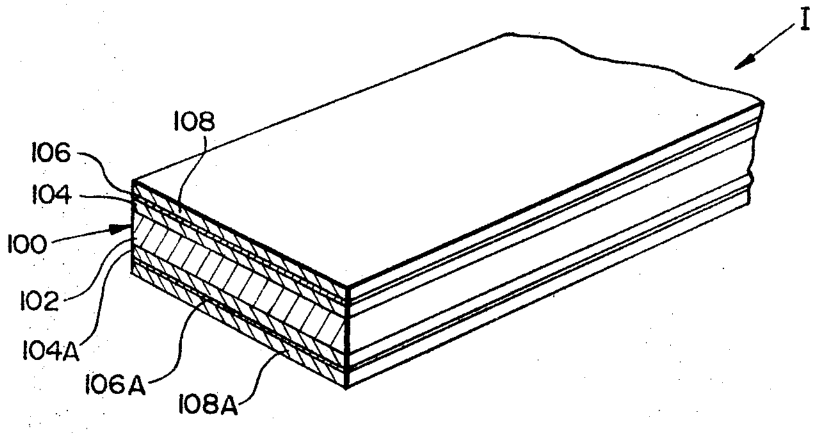

The invention is now described with respect to its origin, examples of its application and citation of some embodiments without attempting to state all possible embodiments, the full scope of application of the invention being limited only as set forth in the appended claims. This specific description makes reference to the accompanying drawings wherein:

FIG. 1 is a sketch of a preferred apparatus for carrying out the process of the invention and FIG. 2 is a schematic cross-section view of the stabilized superconductor product.

The invention was made in the course of trying to provide a good adherent stabilizing coat of copper on a superconductor made by the method substantially as described in the above cited Canadian patent. The approach used was an apparatus similar to that shown in the patent and substituting a source of copper for the niobium of the patent and using argon as the inert flushing gas and hydrogen as the reducing gas and applying electric heating current to the superconductor as it passed through the reaction zone. The following non-limiting examples illustrate the course of failure of this originally intended process (Example I) accompanied however by gradual evolution of the present discovery and success of the process of the invention (Example II).

Example I

Several runs were made in attempts to provide normal metal coatings on a vapor deposited niobium-tin superconductor. Using the same apparatus as was originally used for vapor deposition of superconductor, the superconductor (a ¼-inch wide 2-mil thick metal strip) was brought back in from air as the substrate. (a) In one run chlorine vapor was passed over a tin bath to produce a tin chloride vapor flow of 100 cc. per minute along with an argon flow of 100 cc./min. to a reaction zone. At the same time hydrogen chloride was fed to the reaction zone at 36 cc./min. and hydrogen was also fed in at 100 cc./min. The superconductor strip was heated by a heating current of 3.3 amperes at 54 volts. The strip was observed to develop deposits of a black chloride and failed to consistently pick up tin coating despite several variations of flow and heating rates. It was also observed that deposited tin balled up and failed to wet the superconductor surface. (b) A further series of experiments was made trying to produce hydrogen reduction of copper chloride over a heated superconductor ribbon. Temperatures of about 400 C. were used for a copper source zone and the reaction zone with chlorine passed over the copper to the reaction zone at 40 cc./min. along with 50 cc. argon per minute and hydrogen fed to the reaction zone at 40 cc./min. along with 50 cc./min. argon. The strip was heated as before and fed through the reaction zone at 2.3 feet per minute. Copper chloride was noted in the reaction zone exhaust and the strip turned brown. (c) The chlorine and hydrogen flows were cut-off, the system flushed with argon and then the zone temperatures were raised to 800 (and then lowered to 725 C.). Chlorine flow was resumed at 22 cc./min. and electric heating current through the strip set at 3 amperes. No copper was deposited. (d) The electric heating current to the strip was cut-off and hydrogen flow was resumed at 200 cc./min. During the course of this run chloride deposited in the vicinity of one of the seals causing breakage of the ribbon. Chlorine and hydrogen flows were terminated and rethreading of the strip through the apparatus was begun. (e) During the course of rethreading the strip it was observed that copper was being deposited on it in the absence of reduction feed gasses or heating current. An attempt was made to tin the copper and it tinned well. The system was then started up with 40 cc./min. chlorine flow over copper, temperatures of zones at 430 C. and a strip feed rate of 1 foot per minute and no strip current. The result was deposition on the strip of both copper and copper chloride. The copper deposited well, but exhibited poor bonding related apparently to a contaminated interface between the copper and superconductor. The process was varied by injecting hydrogen at 110 cc./min. and applying 2 amperes strip heating current. The strip turned black. The current was cut-off and the strip turned brown and copper did not deposit. The hydrogen was cut-off and copper did deposit. Bonding tests of the deposited copper were inconclusive. (f) A similar run was resumed with 700 C temperature and no flow injection other than residual gases in the system itself followed by 40 cc./min. chlorine over copper flow along with 300 cc. hydrogen flow and argon over HCl as well as argon injection. Variable deposition results were achieved in this start up. Stopping the system and restarting, with chlorine flow only, improved the copper deposition. Restarting the hydrogen deteriorated performance. Stopping hydrogen improved performance. (g) Resuming deposition runs three days later, a pattern similar to (f) was observed ending in successful copper deposition at 4 cc./min. chlorine flow and argon flow of 50 cc./min. via the copper zone heated at 730 C., the reaction chamber also being heated at 730 C. Micrometer measurements indicated a total copper pick-up of .0001–.0002 inch, but chloride plugging of seals re-occurred.

Example II (a) The deposition system was cleaned and restarted at conditions of 730° C. temperature and 1 foot/min. strip speed and chlorine flow over copper as well as hydrogen flow resulting in black deposits. Cutting off chlorine and hydrogen yielded copper with thickness too small to measure. Chlorine flows at 2 cc./min. and dropping the copper zone temperature to 700 C. held the good appearance of the copper. Then, terminating chlorine flow resulted in no copper deposition and restoration of chlorine restored copper deposition. Putting 3 amperes current through the strip resulted in burning black and termination of this current and resumption to 2 amperes resulted in good copper deposition.

The copper coated strip was electroplated in an acid copper bath and this resulted in good bonding. The test of good bonding was soldering a wire to the strip and pulling apart with the observation of failure between the superconductor and its steel substrate rather than between superconductor and copper strike coat or between copper strike coat and copper overcoat.

Also a portion of the copper strike was etched away and clean super-conductor surface was observed with essentially no black underlying trichloride deposit on the superconductor surface.

It was also observed by microscopically examining a section of the strike coated strip, under magnification of 800 to 1000 times, that the focus of both the copper strike surface and adjacent superconductor surface with the copper etched away was the same. It was also observed that the copper followed the surface roughness of the superconductor and was small even in relation to the grain size of the crystalline niobium-tin superconductor.

Example III

A niobium-tin on steel ribbon (2.7 mils thick, 3/16 inch wide) was passed through a reactor as shown in FIG. 1 at 2.3 feet per minute. Chlorine vapor was admitted to the copper containing conduit 24 at 4 cc./min. Two amperes were passed through the ribbon via contacts (not shown) located at the seals. Copper deposits were obtained with average thickness of 17.3 microinches as determined by weighing the ribbon before and after etching the copper away.

Example IV

Several coating runs were made similar to Example III with the modifications as follows:

Current to ribbon: 1 ampere
Chlorine flow: 40 cc./min.
Ribbon speed:
- (a) 25 feet per minute down to zero with up to 60 seconds residence time in reactor.
- (b) Zero speed with 90–240 seconds residence time in reactor.

Under conditions (a) good copper deposits were obtained. Under conditions (b) black or poorly bonded deposits were obtained.

A residence time in the reactor of preferably no greater than one minute and in no event greater than ten minutes is a necessary limit to prevent contamination of the copper and harm to the bond. This contamination can be relieved in part by a rapid sweeping flow of copper chloride and/or by multiple copper chloride entrances and exhausts along the length of the reactor. To the extent that current is passed through the superconductor to raise its temperature slightly above that of the surrounding gas to improve adhesion of the bond, the above specified short diffusion time limits undesired annealing of the superconductor by such direct heating.

Referring now to FIG. 1 there as shown a preferred apparatus for carrying out the invention. The apparatus comprises a refractory reactor tube 10 through which superconductive strip 11 to be coated is continuously fed.

The strip is unrolled from one coil 12 and rerolled on another coil 14 after passing through the reactor. End seals 16 and 18 of refractory material are provided on the reactor tube ends. An inlet duct 20 is provided between the seals and chlorine is fed to the duct via conduit 22 and an inert carrier gas (argon) is fed to the duct via conduit 24 which is arranged to produce an annular argon flow around the chlorine inlet. The duct 20 is packed with copper in the form of chips, rods, or lathe turnings. Argon is fed into the end seals via inlets 26, 27, 28 and 29 to produce a positive pressure of argon of one inch water; this excludes outside air from the reactor and prevents chloride from condensing on the seals. It also provides, along with the carrier argon flow from conduit 24, a sweeping continuous flow to an exhaust pipe 30.

The reactor tube 10, exhaust pipe 30 and duct 20 are heated by heaters 32 and 34, respectively, which may have the form of Nichome wire windings about the tube and duct with independent power supplies.

Optionally an electrical current source can be connected to the strip 11 to heat it directly, up to 1 or 2 amperes for strip and a fraction of an ampere for fine wire, to supplement the external heaters.

Optionally, also, the entire reactor apparatus can be made as an end section of the reactor shown in Canadian Pat. 706,348 to provide copper strike coating immediately after forming the niobium-tin surface without intermediate air exposure. Cooling arrangements must be provided for dropping the strip temperature from the 1000 C. required for superconductor formation to the 700 C. range for copper strike coating. This variant embodiment, while desirable, is not absolutely necessary since it is a specific advantage of the invention that it is tolerant of prior exposure to air.

Similarly other superconductor surface cleaning steps prior to copper strike coating in accord with the present invention may be desirable but are not absolute prerequisites except in extreme cases of contamination because or the surface cleaning inherent in the strike coat step of the present invention. Such cleaning methods include heating in vacuum, and etching.

Etching in hydrochloric acid is particularly desirable where the superconductor is of the type formed by partial diffusion of a tin coat into a niobium substrate since such superconductors tend to have substantial residual tin at the outer surface. Pre-etching removes the tin so that the copper strike is metallurgically bonded directly to niobium-tin. Residual tin would alloy with the deposited copper.

Referring now to FIG. 2 there is shown a product of the invention 100 which is a stabilized superconducting strip carrying electrical current as indicated by the letter I. The strip comprises a steel substrate strip 102 with crystalline niobium-tin coatings 104 and 104A on its faces formed by the method of the above Canadian patent. The niobium-tin layers are coated by strike coats 106, 106A of copper and overcoated with stabilizing coats 108, 108A of copper. The stabilizing coats are each in excess of .1 mil thick and preferably above .5 mil to provide adequate thermal conductivity and strength to the strip.

The strip 100 has a thickness of about 1–10 mils, per se, and may be multiplied to produce thicker laminates by bonding such strips at their outer copper surfaces and interspersing strength reinforcing or other functional layers as necessary for a particular application.

It is a related advantage that the strength reinforcing ability of the strip is enhanced by the improved adhesion afforded through the present invention which improves coupling between the copper and the substrate (e.g., steel or niobium, as noted above) to make a better high strength laminate.

The strip is most typically used as a winding of an electromagnetic coil and the active area or length of superconductor to be copper coated may be the full length of the strip or particular sections thereof only such as the contacts or joints therein or the portion of the strip exposed to high magnetic field depending on the stabilization requirements of the device in which the strip is to be used.

Since many further changes and modifications can be made in the structure or steps above described embodiments of the invention and still further embodiments and applications can be made without departing from the scope and spirit of the invention, it is to be understood that the invention is not limited to the details of the same except as set forth in the appended claims.

What is claimed is:

1. A process for producing a stabilized superconductor by passing a continuous elongated product in the form of wire, strip, pipe or the like having niobium-tin hard superconductor material at its surface producing a vapor, the vapor containing material which is a normal conducting metal and which is electropositive relative to niobium and tin and passing said vapor over the niobium-tin surface while heating the zone of the strip sufficiently high to promote a displacement reaction which deposits strike coat of the normal metal on the strip while liberating niobium and tin in volatile forms produced by the reaction to produce a strike coating of less than 50 microinches thickness, but sufficiently thick to be continuous, at the product surface; cooling the strike-coated product; and then building up a stabilizing coating of normal conducting metal at least .1 mil thick over the strike coat, the strike coat vapor source being selected so that the temperature for the strike coating of the displacement reaction can be below 800° C. and wherein the heating step for strike coating is carried out below 800° C.

2. The process of claim 1 wherein the niobium-tin of the product to be treated is a surface layer crystalline reaction product of niobium chloride and tin chloride and reducing agents and is essentially free of excess tin and wherein the strike coat step is carried out using a copper chloride vapor source and wherein the heating for promotion of displacement reaction is carried out at a temperature of at least 600° C. and wherein the residence time of the product in the reactor is no greater than one minute.

3. The process of claim 1 wherein the source of heat for the displacement reaction includes means external of the product constituting the primary source of heat.

4. The process of claim 1 wherein the build-up of stabilizing coat is accomplished by soldering a layer of normal conducting metal to the strike coated surface of the product.

5. The process of claim 4 wherein the strike coat is copper and the stabilizing coat is copper.

6. The process of claim 1 wherein the product is in strip form and multiple layers of the stabilized coated product are bonded together at their outer copper surfaces to produce a laminate strip.

References Cited

UNITED STATES PATENTS 3,395,040 7/1968 Prichard et al. ........ 117—227

FOREIGN PATENTS 633,701 12/1949 England ........... 117—107.2
770,109 3/1957 England ........... 117—107.2
777,833 6/1957 England ............ 117—10.2

WILLIAM L. JARVIS, Primary Examiner

U.S. Cl. X.R.

117—107.2, 120; 338—32; 29—599